United States Patent
Kuroda

(10) Patent No.: US 11,091,676 B2
(45) Date of Patent: Aug. 17, 2021

(54) CURABLE RESIN COMPOSITION

(71) Applicant: THREEBOND CO., LTD., Hachioji (JP)

(72) Inventor: Tatsuya Kuroda, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 231 days.

(21) Appl. No.: 16/341,655

(22) PCT Filed: Oct. 12, 2017

(86) PCT No.: PCT/JP2017/036982
§ 371 (c)(1),
(2) Date: Apr. 12, 2019

(87) PCT Pub. No.: WO2018/074316
PCT Pub. Date: Apr. 26, 2018

(65) Prior Publication Data
US 2019/0284455 A1  Sep. 19, 2019

(30) Foreign Application Priority Data
Oct. 17, 2016 (JP) .............................. JP2016-203189

(51) Int. Cl.
| | |
|---|---|
| *C09J 163/04* | (2006.01) |
| *C09J 5/06* | (2006.01) |
| *C09J 11/06* | (2006.01) |
| *C09J 11/08* | (2006.01) |
| *C08L 63/00* | (2006.01) |
| *C08L 101/00* | (2006.01) |
| *C09J 163/00* | (2006.01) |
| *C09J 11/00* | (2006.01) |
| *C09J 201/00* | (2006.01) |

(52) U.S. Cl.
CPC ............. *C09J 163/04* (2013.01); *C08L 63/00* (2013.01); *C08L 101/00* (2013.01); *C09J 5/06* (2013.01); *C09J 11/00* (2013.01); *C09J 11/06* (2013.01); *C09J 11/08* (2013.01); *C09J 163/00* (2013.01); *C09J 201/00* (2013.01); *C08J 2203/22* (2013.01); *C09J 2400/24* (2013.01); *C09J 2433/00* (2013.01); *C09J 2463/00* (2013.01)

(58) Field of Classification Search
CPC . C09J 163/04; C09J 11/00; C09J 11/06; C09J 11/08; C09J 163/00; C09J 201/00; C09J 5/06; C09J 2400/24; C09J 2463/00; C09J 2433/00; C08L 63/00; C08L 163/04; C08L 163/00; C08L 101/00; C08J 2203/22
See application file for complete search history.

(56) References Cited

U.S. PATENT DOCUMENTS

| | | |
|---|---|---|
| 9,537,364 B2 | 1/2017 | Ishida et al. |
| 2004/0235996 A1 | 11/2004 | Shah et al. |
| 2011/0223420 A1 | 9/2011 | Ichiroku |
| 2014/0255326 A1 | 9/2014 | Pasin et al. |
| 2016/0032115 A1 | 2/2016 | Pasin et al. |

FOREIGN PATENT DOCUMENTS

| | | | |
|---|---|---|---|
| CN | 102191005 A | 9/2011 | |
| CN | 102559113 A | 7/2012 | |
| CN | 103483888 A | 1/2014 | |
| CN | 104927738 A | 9/2015 | |
| CN | 105969162 A | 9/2016 | |
| JP | H05-186625 A | 7/1993 | |
| JP | H07-82392 A | 3/1995 | |
| JP | 2007-106963 A | 4/2007 | |
| JP | 2013-236468 A | 11/2013 | |
| TW | 201613991 A | 4/2016 | |
| WO | 2013/013128 A2 | 1/2013 | |
| WO | WO-2013013128 A2 * | 1/2013 | ............ C09J 163/00 |
| WO | 2014/134738 A1 | 9/2014 | |

OTHER PUBLICATIONS

"Ethyl Acetate". by Scifinder. Accessed Jan. 21, 2021. (Year: 2021).*
"Butanone". by Scifinder. Accessed Jan. 21, 2021. (Year: 2021).*
Machine Translation of JP02255883 by Yamamoto et al. (Year: 1991).*
Machine Translation of CN 103483888 (Year: 2014).*
PCT/ISA/210, "International Search Report for International Application No. PCT/JP2017/036982," dated Nov. 14, 2017.
Europe Patent Office, "Search Report for European Patent Application No. 17861344.4," dated Mar. 2, 2020.

* cited by examiner

Primary Examiner — Michael M Dollinger
Assistant Examiner — Christina H. W. Rosebach
(74) Attorney, Agent, or Firm — Manabu Kanesaka

(57) ABSTRACT

A liquid thermally expandable curable resin composition for use such as bonding by filling a clearance has difficulty in achieving both drying property and film forming property and also has a problem with storage stability. The problems were solved with a curable resin composition having the following composition. A curable resin composition comprises: (A) a film forming resin, (B) an epoxy resin, (C) an organic solvent, (D) thermally expandable particles, and (E) a curing agent ingredient for the (B). The (C) is selected from organic solvents having a boiling point of 100° C. or less and being liquid at normal temperature and contains a combination of (C-1) an ester-based solvent and (C-2) one or more solvents selected from ketone-based solvents, ether-based solvents, and glycol-based solvents, and a content ratio between the (C-1) and the (C-2) in a mass ratio is in a range of (C-1)/(C-2)=0.12 to 0.23.

17 Claims, No Drawings

CURABLE RESIN COMPOSITION

RELATED APPLICATIONS

The present application is National Phase of International Application No. PCT/JP2017/036982 filed Oct. 12, 2017, and claims priority from Japanese Application No. 2016-203189, filed Oct. 17, 2016, the disclosure of which is hereby incorporated by reference herein in its entirety.

TECHNICAL FIELD

The present invention relates to a curable resin composition which cures when heated, and particularly to a curable resin composition which has a characteristic of increasing in volume to fill a gap between adherends when expandable particles expand due to heat for curing.

BACKGROUND ART

A curable resin composition containing an epoxy resin as a main ingredient has been conventionally used for various applications including adhesives because of excellence in physical properties such as adhesive strength and mechanical properties of a cured product. In general, many adherends bonded by these adhesives are bonded with their flat surfaces put in contact with each other. However, other many adherends have rough surfaces or porous surfaces, and many adherends themselves have warpage or distortion. Thus, there is a case where uniform and absolute contact between adherends is impossible. Moreover, in the case where tubular members are joined to each other with an adhesive or the case where a dowel is inserted into a dowel hole or a shaft is fitted to a bearing, for example, low dimensional precision and low processing precision of the members may form a large gap between the adherends.

In those cases, a sufficient adhesive strength can be exhibited when the gap between the adherends is completely filled with an adhesive, but insufficient filling may lead to the decrease in adhesion area followed by reduction in adhesive strength. Examples of methods commonly used for the above cases include coating an adhesive thickly on the adherend surfaces in advance, joining the adherends and then pouring a liquid adhesive into the gap followed by permeation, and filling the gap with a liquid adhesive using a fine nozzle such as an injection needle. However, since an adhesive is usually in a liquid state before curing and solidification, it often flows before curing to flow out or protrude beyond the bonded parts, which causes defects after curing unless strict control is performed on the amount of the adhesive coated, the coating site, the coating process, and the like.

Particularly in the case of using an adhesive composed of a thermosetting resin composition containing an epoxy resin or the like as a main ingredient, the viscosity reduces and the fluidity increases due to heating, resulting in a state where the adhesive can easily drip. When the adhesive drips, the adhesive causes problems of not only contaminating the adherends and the work environment but also lowering the adhesion strength or in some cases even failing to bond them as a result of the reduction in adhesion area. As a method of solving such problems, the techniques described in Patent Literatures 1 to 3 and the like use a thermosetting adhesive sheet which is in a solid state at normal temperature in order to solve the problems. During curing and bonding by heating, the adhesive sheet fills a gap between the adherends and bonds them together by causing thermally expandable particles as a constituent ingredient to expand due to heat to increase the volume of the entire adhesion part.

However, the operation of bonding the adherends to each other using the above-mentioned thermally expandable adhesive sheet in a solid state involves complicated processes, requiring processes of cutting out the adhesive sheet according to the shapes of the adherends and further aligning the sheet with the adherend surface before curing and bonding, further followed by inciting for fixture. In addition, the residues of the adhesive sheet after cutout into the shapes of the adherends are a loss and a cause of poor yield, leaving room for improvement.

CITATION LIST

Patent Literatures

Patent Literature 1: Japanese Patent Application Publication No. Hei 5-186625
Patent Literature 2: Japanese Patent Application Publication No. 2007-106963
Patent Literature 3: Japanese Patent Application Publication No. 2013-236468

SUMMARY OF INVENTION

For the purpose of solving the above problems in a thermally expandable adhesive sheet, it is possible to improve the workability in bonding the adherends and the yield of the adhesive by, for example, coating a liquid adhesive having fluidity on the adherends in advance, volatilizing volatile ingredients in the adhesive, and then storing the adherends with the adhesive having no fluidity. However, such a curable resin composition has difficulty in satisfactorily achieving all of the characteristics of drying property, film forming property, and storage stability.

The present inventors have made earnest studies to solve the problems described above and consequently found that this is achieved when a thermally expandable curable resin composition containing an epoxy resin as a main ingredient includes a combination of organic solvents having specific chemical structures at a specific composition ratio as a diluent or solvent being an ingredient for retaining the liquid state before coating. Specifically, a first aspect of the present invention is a curable resin composition including the following (A) to (E).

A curable resin composition comprising:
(A) a film forming resin,
(B) an epoxy resin,
(C) an organic solvent,
(D) thermally expandable particles, and
(E) a curing agent ingredient for the (B), wherein
the (C) has a boiling point of 100° C. or less and is composed of a combination of (C-1) an ester-based solvent and (C-2) a solvent selected from ketone-based solvents, ether-based solvents, and glycol-based solvents, and a content ratio between the (C-1) and the (C-2) is in a range of (C-1)/(C-2)=0.12 to 0.23.

In addition, the present invention also includes the following aspects.

A second aspect is the curable resin composition according the first aspect, wherein
a content of the (C) is 193 to 211 parts by mass relative 010 parts by mass of the (A).

A third aspect is the curable resin composition according to the first or second aspect, wherein a content of the (D) is 45 to 88 parts by mass relative to 100 parts by mass of the (A).

A fourth aspect is the curable resin composition according to any one of the first to third aspects, wherein the (A) contains a phenoxy resin.

A firth aspect is the curable resin composition according to any one of the first to fourth aspects, wherein the (E) contains one or more selected from imidazole derivatives and dicyandiamide.

A sixth aspect is a cured product formed by curing the curable resin composition according to any one of the first to fifth aspects.

Still other aspects of the present invention may be as follows.

[1]

A curable resin composition comprising:
(A) a film forming resin,
(B) an epoxy resin,
(C) an organic solvent,
(D) thermally expandable particles, and
(E) a curing agent ingredient for the (B), wherein
the (C) is selected from organic solvents having a boiling point of 100° C. or less and being liquid at normal temperature and contains a combination of (C-1) an ester-based solvent and (C-2) one or more solvents selected from ketone-based solvents, ether-based solvents, and glycol-based solvents, and a content ratio between the (C-1) and the (C-2) in a mass ratio is in a range of (C-1)/(C-2)=0.12 to 0.23.

[2]

The curable resin composition according to [1] described above, wherein a content of the (C) is 193 to 211 parts by mass relative to 100 parts by mass of the (A).

[3]

The curable resin composition according to [1] or [2] described above, wherein a content of the (D) is 45 to 88 parts by mass relative to 100 parts by mass of the (A).

[4]

The curable resin composition according to any one of [1] to [3] described above, wherein the (A) contains a phenoxy resin.

[5]

The curable resin composition according to any one of [1] to [4] described above, wherein the (E) contains one or more selected from imidazole derivatives and dicyandiamide.

[6]

A cured product formed by curing the curable resin composition according to any one of [1] to [5] described above.

[7]

A method of producing a cured product of the curable resin composition according to any one of [1] to [5] described above, comprising:

obtaining a cured product of the curable resin composition by heating the curable resin composition to a temperature equal to or higher than an activation temperature of the (E) at which the (E) starts to cure the epoxy resin (B).

Since the present invention is excellent in drying property and film forming property during the formation of a coating film while being a liquid thermally expandable adhesive having fluidity, highly reliable adhesion with reduced risk of peeling or falling due to adhesion failure is possible, and moreover, adhesion with extremely small disposal loss during operation is possible. In addition, it can be used for applications such as adhesion, sealing, coating, and potting by utilizing excellent characteristics of the curable resin composition containing an epoxy resin as a main ingredient.

Hereinafter, the present invention is described in detail.

The (A) used in the present invention is a film forming resin. In the curable resin composition of the present invention, the (A) is not particularly limited as long as it is an ingredient for firmly retaining a coating film after curing of the composition and it is a solid ingredient having no fluidity at normal temperature, particularly 25° C. However, the (B) to be described later is omitted. Here, the "normal temperature" means a range of 20° C.±15° C. as defined in JIS Z 8703 and preferably a temperature of 20 to 30° C., and means a temperature of 25° C. unless otherwise specified. A preferable example of the ingredient (A) is a thermoplastic resin and/or an elastomer. Examples of the thermoplastic resin include polyesters, polyethers, polyamides, polyurethane polyvinyl alcohols, polyvinyl formals, polyvinyl butyrals, polystyrenes, polycarbonates, acryls, EVA, phenoxies, alkyds, terpenes, coumarone indenes, and petroleum resins. Examples of the elastomer include ionomers, nitrile rubbers and hydrogenated products thereof, styrene-based elastomers, natural rubbers, chlorine-based rubbers, xylene resins, EPDM, isoprenes, butyl rubbers, and fluorine-based elastomers. These materials may have a reactive group in their molecules and may have such a characteristic that stimulation such as heating causes a cross-linking reaction or the like to form a firm network. In addition, these ingredients may be used singly or in mixture of two or more kinds.

A phenoxy resin is particularly preferable as the ingredient (A) from the viewpoint of the mechanical properties and the adhesive strength of the cured product. Since a phenoxy resin generally has a structure with a glycidyl group at the molecular end, heating allows the cross-linking reaction to proceed to some extent in a system containing a curing agent, making it possible to form a more firm and denser coating film. In the present invention, however, no limitation is imposed on the reactivity of the phenoxy resin. Examples of commercially available products of the phenoxy resin include, but not limited to, jER 1256 (phenoxy resin composed of a bisphenol A type skeleton, epoxy equivalent weight of 7,800, Tg of about 100° C., and Mw of 51,000, and further, jER 1256B40 has a solid content of 40% by mass) such as jER 1256B40, jER 4250 (phenoxy resin composed of a bisphenol A and bisphenol F skeletons, epoxy equivalent weight of 8,200, Tg of about 70° C., and Mw of 59,000), jER 4275, YX6954BH30, and Y17290BH30, which are products of Mitsubishi Chemical Corporation; PKHB, PKHC, PKHH, PKHJ, PKFE, and PKHP-2000, which are products of InChem; and YP-50, YP-50S, YP-55, and YP-70, which are products of Nippon Steel & Sumikin Chemical Co., Ltd.

The (B) used in the present invention is an epoxy resin composed of repeating units each having two or more epoxy groups in the molecule. In the curable resin composition of the present invention, the (B) is a main ingredient which serves functions of forming a curable coating film by the action with the curing agent ingredient (E) and exhibiting adhesiveness to the adherends. The epoxy resin can be used without particular limitation on its structure as long as it is a polymer compound composed of repeating units each having two or more epoxy groups in the molecule. Specific examples of bifunctional epoxy compounds composed of repeating units each having two epoxy groups can include bisphenol type epoxy resins such as bisphenol A type epoxy resin, bisphenol F type epoxy resin, bisphenol S type epoxy resin, bisphenol AS type epoxy resin, bisphenol AD type epoxy resin, and tetrabromobisphenol A type epoxy resin; hydrogenated bisphenol type epoxy resins obtained by hydrogenating these bisphenol type epoxy resins; oxazolidone type epoxy resins obtained by reacting bisphenol A type epoxy resins with bifunctional isocyanates; alkylene glycol type epoxy resins such as ethylene glycol diglycidyl ether, propylene glycol diglycidyl ether, 1,2-butanediol diglycidyl ether, 1,3-butanediol diglycidyl ether, 1,4-butanediol diglycidyl ether, 2,3-butanediol diglycidyl ether, 1,5-pentanediol diglycidyl ether, 1,6-hexanediol diglycidyl ether, neopentyl glycol diglycidyl ether, and 1,4-cyclohexanedimethanol diglycidyl ether; alkylene oxide diol type epoxy resins such as diethylene glycol diglycidyl ether, dipropylene glycol diglycidyl ether, triethylene glycol diglycidyl ether, tripropylene glycol diglycidyl ether, polyethylene glycol diglycidyl ether, and polypropylene glycol diglycidyl ether; and resorcin diglycidyl ether, hydroquinone diglycidyl ether, 4,4'-dihydroxy-3,3',5,5'-tetramethylbiphenyl diglycidyl ether, diglycidyl ethers of 1,6-dihydroxynaphthalene, diglycidyl ethers of 9,9-bis(4-hydroxyphenyl)fluorene, diglycidylaniline, biphenyl type epoxy resins, and naphthalene type epoxy resins.

Specific examples of polyfunctional epoxy compounds composed of repeating units each having three or more epoxy groups can include novolak type epoxy resins such as phenol novolak type epoxy resin, cresol novolak type epoxy resin, and naphthol novolak type epoxy resin; glycidyl ethers such as triglycidyl ethers of tris(p-hydroxyphenyl) methane, tetraglycidyl ethers of tetrakis(p-hydroxyphenyl) ethane, triglycidyl isocyanurate, triglycidyl ethers of glycerin, and tetraglycidyl ethers of pentaerythritol; glycidyl amine compounds such as tetraglycidyl diamino diphenyl methane, tetraglycidyl-m-xylylenediamine, triglycidyl-m-aminophenol, and triglycidyl-p-aminophenol. These polymer compounds may be used singly or in mixture of two or more kinds. In the present invention, it is preferable to use a compound containing two epoxy groups in the molecule and more suitable to contain a bisphenol type epoxy resin selected from bisphenol A type epoxy resins and bisphenol F type epoxy resins from the viewpoint of heat resistance, mechanical properties, and availability of the obtained cured product. In addition, the bisphenol type epoxy resin may be allowed to contain a monofunctional epoxy compound if necessary for the purpose of adjusting workability and mechanical properties of the cured product.

Examples of known commercially available products of (B) include, but not limited to, jER 828, 1001, 801, 806, 807, 152, 604, 630, 871, YX8000, YX8034, and YX4000, which are products of Mitsubishi Chemical Corporation; EPICLON which is a product of DIC Corporation, for example EXA-830, 850, 830LVP, 850CRP, 835LV, HP4032D, 703, 720, 726, and 820; EP4100, EP4000, EP4080, EP4085, EP4088, EPU6, EPU7N, EPR4023, EPR1309, and EP4920, which are products of Asahi Denka Co., Ltd.; TEPIC which is a product of Nissan Chemical Industries, Ltd.; KF-101, KF-1001, KF-105, X-22-163B, and X-22-9002, which are products of Shin-Etsu. Chemical Co., Ltd.; DENACOL EX 411, 314, 201, 212, 252, which are products of Nagase ChemteX Corporation; DER 331, 332, 334, and 542, which are products of the Dow Chemical Company; and N-660, N-665, N-670, N-673, N-680, N-690, N-695, N-665-EXP, N-672-EXP, N-655-EXP-S, N-662-EXP-S, N-665-EXP-S, N-670-EXP-S, N-685-EXP-S, N-673-80M, N-680-75M, and N-690-75M, which are products of DIC Corporation.

The content of the (B) in the present invention is not particularly limited, but a content relative to 100 parts by mass of the (A) is suitably 200 to 600 parts by mass, more suitably 300 to 500 parts by mass, and particularly suitably 350 to 450 parts by mass. When the amount is the lower limit value or more, the curable resin composition of the present invention is given adequate adhesive force to the adherends. When the amount is the upper limit value or less, no problem arises in the mechanical properties such as the hardness and flexibility of the cured product, and moreover, no adverse effect arises on the storage stability of the curable resin composition.

The (C) used in the present invention is an organic solvent. The (C) is selected from organic solvents having a boiling point of 100° C. or less and being liquid at normal temperature. In general, the ingredient (C) contains a combination of (C-1) an ester-based solvent and (C-2) one or more solvents selected from ketone-based solvents, ether-based solvents, and glycol-based solvents. Use of the (C) makes it possible for the curable resin composition of the present invention to, in the case of use as a liquid adhesive having fluidity, have a film forming property and drying property necessary for forming on the adherends a coating film before curing and also to have storage stability in the liquid state while having fluidity (viscosity) suited for coating.

Specific examples of (C-1) usable in the present invention can include compounds such as ethyl propionate (boiling point of about 99° C.), tertiary butyl acetate (boiling point of about 98° C.), propyl acetate (boiling point of about 97° C.), isopropyl acetate (boiling point of about 90° C.), methyl propionate (boiling point of about 79° C.), ethyl acetate (boiling point of about 77° C.), methyl acetate (boiling point of about 57° C.), ethyl formate (boiling point of about 54° C.), and methyl formate (boiling point of about 32° C.). These compounds may be used singly or in mixture of two or more kinds. In the curable resin composition of the present invention, the compound is a factor which particularly governs the drying property and the film forming property during the formation of a coating film.

Specific examples of (C-2) usable in the present invention can include compounds such as ketone-based solvents: acetone (boiling point of about 56° C.), methyl ethyl ketone (MEK, boiling point of about 80° C.), and ether-based solvents and glycol-based solvents: methyl tertiary butyl ether (boiling point of about 55° C.), tetrahydrofuran (THF) (boiling point of 66° C.), isopropyl ether (boiling point of about 68° C.), dioxolane (boiling point of about 75° C.), and tetrahydropyran (THP) (boiling point of 88° C.). These compounds may be used singly or in mixture of two or more kinds. In the curable resin composition of the present invention, the compound is an important factor for uniformly dissolving or diluting and dispersing the coating film forming ingredient in the liquid state before curing, in particular, the (A).

In the present invention, from the balance of the storage stability in the liquid state and the volatility during the formation of a coating film of the curable resin composition, a particularly suitable combination is that of an ester-based solvent (C-1) having a boiling point in a range of 55 to 85° C., specifically methyl propionate, ethyl acetate, or methyl acetate with a ketone-based solvent (C-2) having a boiling point in a range of 55 to 85° C., specifically acetone or methyl ethyl ketone. Use of the combination of organic solvents makes it possible for the curable resin composition of the present invention to exhibit the favorable characteristics described above. It is appropriate that the boiling points of (C-1) and (C-2) are preferably values approximate to each other, for example in a range of 55 to 85° C. and preferably 57 to 80° C., and the difference between their boiling points is, for example, 35° C. or less, preferably 30° C. or less, and more preferably 25° C. or less.

A suitable mass ratio between (C-1) and (C-2) in the present invention is, for example, (C-1)/(C-2)=0.12 to 0.23, more preferably 0.125 to 0.225, further preferably 0.127 to 0.220, particularly preferably 0.13 to 0.20, and especially preferably 0.15 to 0.18. A composition ratio in those ranges makes it possible for the curable resin composition of the present invention to exhibit an appropriate drying property and film forming property during curing, also to retain storage stability in the liquid state, and to uniformly disperse the composition.

Furthermore, it is desirable that, in the present invention, the content of (C) relative to 100 parts by mass of the (A) is in a range of, for example, 193 to 211 parts by mass, more suitably 194 to 220 parts by mass, and further suitably 195 to 210 parts by mass. When the amount is the lower limit value or more, the curable resin composition of the present invention has appropriate fluidity in the liquid state, which reduces the possibility of causing a problem with the workability during coating. When the amount is the upper limit or less, the curable resin composition of the present invention reduces the possibility that too large a fluidity in the liquid state could result in leakage due to the failure of fixture to the substrate surface when coated on a substrate or in prevention of the formation of a homogeneous coating film due to dripping along an inclined portion.

The (D) of the present invention is thermally expandable particles. A conventionally known material can be used as the (D) as long as it increases its volume by stimulation of heating. Use of the (D) of the present invention makes it possible to give the curable resin composition thermal expandability. Thus, when the curable resin composition is coated on the adherends and then the coating film formed by volatilizing the (C) is heated at the expansion start temperature of the ingredient (D) or more, the curable coating film expands and is allowed to fill the clearance between the adherends, making it possible to achieve reliable adhesion with reduced risk of peeling or falling due to adhesion failure.

The known thermally expandable particles usable in the present invention can be appropriately selected from, for example, inorganic compound-based thermally expandable particles having thermal expandability such as ammonium carbonate, ammonium hydrogen carbonate, ammonium nitrite, ammonium borohydride, and azides; organic compound thermally expandable particles having thermal expandability such as fluorinated alkanes including trichloromonofluoromethane, azo-based compounds including azobisisobutyronitrile, hydrazine-based compounds including paratoluenesulfonyl hydrazide, semicarbazide-based compounds including p-toluenesulfonyl semicarbazide, triazole-based compounds including 5-morpholyl-1,2,3,4-thiatriazole, and N-nitroso compounds including N,N-dinitrosoterephthalamide; and microcapsule-based thermally expandable particles obtained by enclosing low boiling point hydrocarbon compounds in a microcapsule. Thermally expandable particles particularly preferable in the present invention are microcapsule-based thermally expandable particles.

The microcapsule-based thermally expandable particles are microcapsules each having a gas barrier thermoplastic resin as a shell and enclosing a low boiling point compound in the shell. When the microcapsule is heated, the thermoplastic resin of the shell ingredient softens and the low boiling point compound vaporizes to increase in volume, and as a result the microcapsule expands to form a hollow sphere.

Examples of the thermoplastic resin constituting the shell of the microcapsule include vinylidene chloride, acrylonitrile, polystyrenes, polymethacrylate, and potyvinylal. Since the thermoplastic resin usually has a gas barrier property, the low boiling point substance is retained in the particles even in the case of heat expansion. Examples of the low boiling point compound enclosed in the shell can include compounds and materials including hydrocarbon compounds in the liquid state at normal temperature and having a boiling point of up to approximately 100° C., such as isopentane (boiling point of about 28° C.), normal pentane (boiling point of about 36° C.), cyclopentane (boiling point of about 49° C.) normal hexane (boiling point of about 67° C.), isohexane (boiling point of about 62° C.), cyclohexane (boiling point of about 81° C.), 3-methylhexane (boiling point of about 92° C.), normal heptane (boiling point of about 98° C.), isooctane (boiling point of about 99° C.), and petroleum ether (boiling point of 40 to 60° C.), among which it is possible to list easily gasifying isopentane, n-pentane, and the like.

In the present invention, the microcapsule-based thermally expandable particles used may be a known commercially available product. Examples of commercially available products of the microcapsule-based thermally expandable particles include Expancel 053 WU 40, 053 DU 40 (both having an expansion start temperature of 96 to 103° C.), 031 WU 40, 031 DU 40 (both having an expansion start temperature of 80 to 95° C.), 007 WU 40 (expansion start temperature of 91 to 99° C.), 909 DU 80 (expansion start temperature of 120 to 130° C.), 920 DU 40 (expansion start temperature of 123 to 133° C.), and 930 DU 120 (expansion start temperature of 122 to 132° C.), which are products of Japan Fillite Co., Ltd., Matsumoto Microsphere F-30 (expansion start temperature of 70 to 80° C.), F-36 (expansion start temperature of 70 to 80° C.), F-36LV (expansion start temperature of 75 to 85° C.), F-48 (expansion start temperature of 90 to 100° C.), F-50 (expansion start temperature of 95 to 105° C.), F-65 (expansion start temperature of 105 to 115° C.), F-100M (expansion start temperature of 115 to 125° C.), FN-100S (expansion start temperature of 125 to 135° C.), FN-100SS (expansion start temperature of 120 to 130° C.), FN-100 (expansion start temperature of 120 to 135° C.), FN-100M (expansion start temperature of 125 to 135° C.), and FN-100M (expansion start temperature of 125 to 135° C.), which are products of Matsumoto Yushi-Seiyaku Co., Ltd., and the Kureha Microsphere series, which are products of Kureha Chemical Co., Ltd. These commercially available products may be used singly or in mixture of two or more kinds. In addition, as these commercially available products, it is preferable to use ones having an expansion start temperature of, but not limited to, about 130° C. or less.

The expansion start temperature of the thermally expandable particles of the present invention means the temperature at which the thermally expandable particles starts to expand and is preferably lower than the activation temperature of the (E) to be described later. Although there are some variations in the starting temperature depending on the particles, it is appropriate that the temperature in the start period of expansion is, for example, 50 to 180° C., preferably 60 to 170° C., and more preferably 70 to 150° C. It is appropriate that the expansion particularly preferably starts at 100° C. or a temperature exceeding 100° C. and the expansion especially preferably starts at a temperature of 120° C. or more. The expression of the expansion start temperature generally includes a tolerance tier variation by about 20° C., preferably about 15° C., and more preferably about 10° C. depending on a variation among particles. Ideally, it is desirable that the heating in a certain low temperature range expands the thermally expandable particles and then the (E) is activated to start reaction with the (B) (also with the (A) in some cases) by further increasing the heating temperature in the sate where the thermally expandable particles are sufficiently expanded. However, it is actually difficult to precisely control the state immediately before the adherends are attached, that is, the temperature of the curable resin composition present in the narrow gap between the adherends. Therefore, as practical heating conditions, it seems to be no problem to employ a process in which, in the gradual heating in the range from normal temperature to the expansion start temperature or higher, the thermally expandable particles first expands in the course of temperature rise, the (E) starts to be activated during the expansion of them, and after that the (E) starts to react with the (B), and eventually forms a curable coating film.

In the present invention, it is desirable that the content of the (D) relative to 100 parts by mass of the (A) is in a range of, for example, 45 to 88 parts by mass and more suitably 48 to 80 parts by mass. When the amount is the lower limit value or more, the curable resin composition of the present invention can retain an appropriate expandability and achieve adhesion reliability. On the other hand, when the amount is the upper limit or less, the curable resin composition of the present invention does not become excessive in the viscosity in the liquid state, which does not result in a situation where the nozzle clogs during the coating with a dispenser or the like or the pressure in the extrusion from the tank becomes too high. As a result, the workability during coating is favorable.

The (E) of the present invention is a curing agent ingredient for the (B). The (E) is not particularly limited as long as it can be activated by the stimulation of heating to cure the (B), and it is preferable that the activation temperature of the (E) is higher than the expansion start temperature of the (D). The activation temperature mentioned here is generally the temperature to start curing of the epoxy resin of the (B), and is determined by the type or the like of the epoxy resin of the (B). Expansion and curing take place at the same time if the activation temperature is the same temperature as the expansion start temperature, and if the activation temperature is set higher than the expansion start temperature (for example, by about 20° C., 50° C., 70° C., 100° C., 120° C., or 150° C.), the curable resin composition first expands and then cures. The specific activation temperature is, for example, 60° C. or more, preferably 70° C. or more, more preferably 80° C. or more, further preferably 100° C. or more, particularly preferably 110° C. or more, and especially preferably 120° C. or more and, for example, 200° C. or less, preferably 190° C. or less, and more preferably 180° C. or less, and appropriately in a range of any combination of these upper limit values and lower limit values. A preferable activation temperature is, for example, 100 to 200° C., more preferably 110 to 190° C., and further preferably 120 to 180° C. Conventionally known materials can be used as the (E), and specific examples thereof include aliphatic and aromatic amine compounds, polyamine-epoxy adducts, ketimine compounds, aliphatic and aromatic thiol compounds, imidazole and derivatives leaving the characteristics of the compound, dicyandiamide and derivatives leaving the characteristics of the compound, acid anhydride compounds, polyamide compounds, hydrazide compounds, phenol novolaks, novolak resins such as cresol novolak, Lewis acids such as boron fluoride, aluminum chloride, zinc chloride (II), and iron (III) chloride, and microencapsulated ones of the above ingredients. These may be used singly or in mixture of two or more kinds. Among these materials, one or more of aliphatic and aromatic amine compounds, aliphatic and aromatic thiol compounds, imidazole and derivatives thereof, and dicyandiamide are suitable, which are substances stable at normal temperature and rapidly starting a curing reaction by heating. The ingredient (E) more desirably contains imidazole, a derivative thereof, or dicyandiamide, and particularly suitably contains dicyandiamide from the viewpoint of availability, mechanical properties of the cured product, and the like.

The content of the (E) in the present invention is not particularly limited, but is desirably in a range of 0.1 to 50 parts by mass, more suitably 0.5 to 40 parts by mass, and particularly suitably 1 to 30 parts by mass relative to 100 parts by mass of the (B). When the amount is the lower limit value or more, the curable resin composition of the present invention is allowed to retain appropriate curability. When the amount is the upper limit or less, the curable resin composition of the present invention can provide a curable resin composition without a problem with storage stability in the liquid state.

In addition, in the present invention, the curable resin composition can further contain any additional ingredient as long as its characteristics are not impaired. Examples of the ingredient can include plasticizers, adhesiveness improving ingredients such as a silane coupling agent, dispersants, leveling agents, wetting agents, surfactants such as a defoamer, antistatics, surface lubricants, corrosion inhibitors, preservatives, viscoelasticity modifiers, rheology modifiers, colorants, antioxidants such as an ultraviolet absorber, and fillers composed of an organic or inorganic powder which may have conductivity. Moreover, the curable resin composition of the present invention may contain, in addition to the (A), a polymer material such as a polyester resin, a polycarbonate resin, a polyacrylic resin, a polyurethane resin, or a polyvinyl resin for the purpose of adjusting viscoelasticity and the like.

The curable resin composition of the present invention can be applied to applications which conventionally use an epoxy-based curable resin composition, such as adhesion (including conductive adhesion or insulating adhesion), sealing, coating, potting, and insulation, and since it is a thermally expandable curable resin composition excellent in volatility, film forming property, and storage stability, the curable resin composition of the present invention is suitable in applications involving attach adhesion by heating and further in applications involving adhesion by clearance filling. Particularly preferable is a liquid thermally expandable adhesive having fluidity. Examples of the applications include application to materials such as metals, ceramics, resin materials, glass, silicon, and minerals, which are used in applications for construction materials, transportation equipment, electrical and electronic equipment, industrial equipment, and the like. Specifically, the curable resin composition of the present invention can be appropriately used in various applications such as fixture adhesion between electronic components such as magnets and coils of rotary electric machines (motors) used in automobiles and industrial equipment, fixture and seal adhesion of automobile body related components, fixture and seal adhesion between construction materials, insulating or conductive adhesion of electrical and electronic equipment components, impact absorption, thermal insulation, gap filling and the like for other various industrial components and the like.

A particularly preferable mode of using the curable resin composition of the present invention involves coating on the bonded part of various adherends in advance followed by volatilization of the organic solvent (C) to form an uncured coating film. This makes the positioning easy because the adhesion surface is in a dry state until the adherend is brought into contact with the counterpart member, and the working environment is not contaminated because no dripping takes place. Here, usable examples of the adherend include glass, polycarbonates, various metals (iron, copper, stainless steel, aluminum, magnesium, and the like), alloys containing such metals, ceramics, stone materials, and wood. After contact with the counterpart, the adherend is bonded by carrying out heating for the expansion of the (D) and the activation of the (E). The expansion of the (D) and the activation of the (E) are appropriately such that the expansion and the curing take place at the same tune or the curing by the activation takes place after the expansion, and it is appropriate that the heating temperature and time for the expansion and the activation are, for example, 100 to 200° C., preferably 110 to 190° C., and further suitably 120 to 180° C. and for 10 to 120 minutes, preferably 15 to 100 minutes, and further suitably 20 to 80 minutes. A gap may be sandwiched between the adherends before heating, and it is possible even in such a case to carry out adhesion with no gap between the adherends after heat curing and hence with little risk of adhesion failure. Note that, in the present invention, the cured product obtained by curing the curable resin composition is also included in the technical scope.

Hereinafter, the effects of the present invention are described in detail with reference to examples, but these examples are not intended to limit the embodiments of the present invention.

EXAMPLES

The characteristics of the curable resin composition of the present invention were evaluated and studied in. Examples and Comparative Examples by the following methods. The following materials were used for the constituent ingredients contained in the curable resin composition of the present invention and the curable resin compositions used for comparison (hereinafter collectively referred to simply as the "composition"). In addition, the compositions were prepared in accordance with the composition ratios listed in Tables 1 to 3. The numerical values listed in the tables are in parts by mass of the ingredients unless otherwise specified.
(A) Film Forming Resin
jER 1256B40: This is a bisphenol A type phenoxy resin having a molecular weight of about 45,000 dissolved and diluted with methyl ethyl ketone, and is a product of Mitsubishi Chemical Corporation with a solid content of 40% by mass and an epoxy equivalent weight of 6,700 to 8,000. Note that, in the tables, only the mass of the solid content (resin ingredient) is listed for the ingredient, and methyl ethyl ketone is listed in the row of (C-2).
(B) Epoxy Resin
DER 331: a bisphenol A type epoxy resin in the liquid state at normal temperature (25° C.), an epoxy equivalent weight of 186 to 190, and a product of Dow Chemical Japan Ltd.
EPICLON N-695: a cresol novolak type epoxy resin, an epoxy equivalent weight of 209 to 219, and a product of DIC Corporation.
EPICLON EXA-830: a bisphenol F type epoxy resin in the liquid state at normal temperature, an epoxy equivalent weight of 165 to 177, and a product of DIC Corporation.
(C) Organic Solvent Having Boiling Point of 100° C. or Less
(C-1) Ester-Based Solvent
ethyl acetate: a boiling point of about 77° C. and a product of San-Ai Oil Co., Ltd.
(C-1') Solvents Other than Above
butyl acetate: a boiling point of about 126° C. and a product of San-Ai Oil Co., Ltd.
hexane: a boiling point of about 68° C. and a product of Maruzen Petrochemical
(C-2) Combination of Solvents Selected from Ketone-Based Solvents, Ether-Based Solvents, and Glycol-Based Solvents
methyl ethyl ketone: a boiling point of about 80° C. and a product of San-Ai Oil Co., Ltd.
(D) Thermally Expandable Particle
Expancel 920 DU 40: an average particle diameter of 10 to 14 μm before expansion, an expansion start temperature of 123 to 133° C., a shell material of acrylic polymer, a microcapsule composed of isopentane expansion ingredient, and a product of Japan Fillite Co., Ltd.
(E) Curing Agent Ingredient for Above (B)
jERCURE DICY7: a finely pulverized product of dicyandiamide, a 50% particle diameter of 3 μm, a melting point of 210° C., and a product of Mitsubishi Chemical Corporation.
CUREZOL 2MAOK-PW: an isocyanuric acid adduct of imidazole compound, a decomposition temperature of 260° C., a decomposition temperature of 260° C., and a product of Shikoku Chemicals Corporation.

Each of the compositions evaluated in Examples and Comparative Examples was prepared by the following procedures. Specifically, predetermined amounts of the (A), (B), and (C) were first charged into a mixing vessel, and mixed and stirred to form a uniform mixture solution. After that, predetermined amounts of (D) and (E) were sequentially charged into the mixture solution, followed by mixture and stirring to obtain a uniform composition.

The compositions for evaluation prepared by the above procedures were subjected to characteristic evaluation under the following conditions for the purpose of first studying the combination of (C). Table 1 also shows the results.
[Drying Property]

An area of 3 cm squares on the surface of a smooth glass plate was uniformly coated using a bar coater so that the uncured film thickness of each composition was 100 μm. This was allowed to stand in a thermostatic chamber at 90° C. for 10 minutes, followed by volatilization of the volatile ingredients to form an uncured coating film. The surface of the coating film was lightly touched with a fingertip degreased and cleaned with alcohol to visually observe the presence of absence of the adhesion of the coating film to the fingertip. Evaluation was carried out such that the ones without adhesion to the fingertip was acceptable (expressed as "◯") and the ones with adhesion were unacceptable (expressed as "×").
[Film Forming Property]

Evaluation was carried out by visually observing the uniformity of the coating film when an uncured coating film was formed under the same conditions as in the drying property evaluation. Evaluation was carried out as follows. The acceptable ones (expressed as "◯") were such that the coating film was completely uniform in the coating area and there was no failure such as cissing, crawling, or orange peel, and the unacceptable ones (expressed as "×") were such that part of the coating film was not uniformly distributed on the glass surface due to cissing, crawling, or orange peel, or the like.

[Heat Volatilization Residual Balance]

Measurement was carried out on the mass of each composition before and after the formation of an uncured coating film under the same conditions as in the drying property evaluation (before and after the volatilization of the volatile ingredients by heating at 90° C.), and the heat volatilization residual balance (%) was calculated in accordance with the following formula for listing.

heat volatilization residual balance (%)=mass after volatilization/mass before volatilization×100

[Storage Stability]

Each of the compositions with an elapsed time of 30 minutes or less after preparation was sealed in a transparent glass reagent bottle and allowed to stand in a thermostatic chamber at 10° C. for 2 months, which was visually observed for evaluation. The ones evaluated as acceptable (expressed as "○") were such that no separation, precipitate, or the like was observed in the liquid and little reduction in fluidity was observed, specifically, it took less than 2 seconds for the liquid surface to move toward the upper portion of the bottle after horizontally tilting the reagent bottle. On the other hand, the ones evaluated as unacceptable (expressed as "×") were such that obvious separation or precipitate was observed (dispersion failure) and the fluidity of the compositions initially having fluidity was significantly reduced, specifically; it took 2 seconds or more for the liquid surface to move toward the upper portion of the bottle after horizontally tilting the reagent bottle (thickening) and both dispersion failure and thickening were observed.

TABLE 1

| | Ingredient | Example 1 | Comparative Example 1 | Comparative Example 2 | Comparative Example 3 |
|---|---|---|---|---|---|
| (A) | jER 1256B40 | 20 | 20 | 20 | 20 |
| (B) | DER 331 | 28 | 28 | 28 | 28 |
| | N-695 | 40 | 40 | 40 | 40 |
| | EXA-830 | 12 | 12 | 12 | 12 |
| (C) (C-1) | Ethyl Acetate | 6.0 | | | |
| (C-1') | Hexane | | 6.0 | | |
| | Butyl Acetate | | | 6.0 | |
| (C-2) | Methyl Ethyl Ketone | 34.5 | 34.5 | 34.5 | 40.5 |
| (D) | 920 DU 40 | 12.0 | 12.0 | 12.0 | 12.0 |
| (E) | DICY7 | 6.8 | 6.8 | 6.8 | 6.8 |
| | 2MAOK-PW | 1.2 | 1.2 | 1.2 | 1.2 |
| | Total | 160.5 | 160.5 | 160.5 | 160.5 |
| | (C-1)/(C-2) | 0.174 | 0.174 | 0.174 | 0 |
| Characteristic Evaluation | Drying Property | ○ | ○ | × | ○ |
| | Film Forming Property | ○ | ○ | ○ | ○ |

TABLE 1-continued

| | Ingredient | Example 1 | Comparative Example 1 | Comparative Example 2 | Comparative Example 3 |
|---|---|---|---|---|---|
| uation | Heat Volatilization Residual Balance (%) | 78 | 78 | 78 | 78 |
| | Storage Stability | ○ | × | ○ | × |

The results of Table 1 show that no problem arose in all of the characteristics, drying property, film forming property, and storage stability, only in the case of the combination of (C-1) ethyl acetate being an ester-based solvent having a boiling point of 100° C. or less and (C-2) MEK being a ketone-based solvent having a boiling point of 100° C. or less as the (C). On one hand, Comparative Example 1 using hexane being an aliphatic hydrocarbon-based solvent (non-ester-based solvent) having a boiling point of 100° C. or less as the (C-1) was continued to result in poor stability during storage due to the inability to homogeneously disperse the composition. On the other hand, Comparative Example 2 using butyl acetate being an ester-based solvent having a boiling point of 100° C. or more as the (C-1) was confirmed to lead to poor evaluation results of drying property due to insufficient volatility. Moreover, Comparative Example 3 not containing the (C-1) and only using the solvent (C-2) was also confirmed to result in poor storage stability.

Next, the combination of (C-1) and (C-2) was fixed to ethyl acetate and MEK to carry out evaluation for the study of the range of each content ratio. In addition to the above four items, the evaluation item was also carried out on the viscosity measured under the following conditions. Table 2 also shows the evaluation results.

[Viscosity]

Each of the compositions was weighed and taken in an amount of 0.4 ml and added dropwise to the center portion of the sample cup of a cone plate type rotational viscometer to carry out measurement under the following measurement conditions. As the measurement results, the viscosity values (Pa·s in accordance with JIS-K-7117-2 or JIS-Z-8803) were listed.

measurement temperature: 25° C.
cone plate: 3° R14
rotational speed: 10 rpm
measurement time: 1 minute It is desirable that a suitable viscosity range in the curable resin composition of the present invention is preferably less than 20 Pa·s and more suitably less than 18 Pa·s from the viewpoint of handling property as a liquid composition, for example easiness of forming a homogeneous and smooth coating film and securing easiness of coating with a dispenser.

TABLE 2

| | | Ingredient | Comparative Example 4 | Comparative Example 5 | Example 2 | Example 1 | Example 3 | Comparative Example 6 | Comparative Example 7 |
|---|---|---|---|---|---|---|---|---|---|
| (A) | | jER 1256B40 | 20 | 20 | 20 | 20 | 20 | 20 | 20 |
| (B) | | DER 331 | 28 | 28 | 28 | 28 | 28 | 28 | 28 |
| | | N-695 | 40 | 40 | 40 | 40 | 40 | 40 | 40 |
| | | EXA-830 | 12 | 12 | 12 | 12 | 12 | 12 | 12 |
| (C) | (C-1) | Ethyl Acetate | 2.0 | 4.0 | 4.5 | 6.0 | 7.0 | 8.0 | 10.0 |
| | (C-2) | Methyl Ethyl Ketone | 34.5 | 34.5 | 34.5 | 34.5 | 34.5 | 34.5 | 34.5 |
| (D) | | 920 DU 40 | 12.0 | 12.0 | 12.0 | 12.0 | 12.0 | 12.0 | 12.0 |

TABLE 2-continued

|   | Ingredient | Comparative Example 4 | Comparative Example 5 | Example 2 | Example 1 | Example 3 | Comparative Example 6 | Comparative Example 7 |
|---|---|---|---|---|---|---|---|---|
| (E) | DICY7 | 6.8 | 6.8 | 6.8 | 6.8 | 6.8 | 6.8 | 6.8 |
|   | 2MAOK-PW | 1.2 | 1.2 | 1.2 | 1.2 | 1.2 | 1.2 | 1.2 |
|   | Total | 156.5 | 158.5 | 159.0 | 160.5 | 161.5 | 162.5 | 164.5 |
|   | (C-1)/(C-2) | 0.058 | 0.116 | 0.130 | 0.174 | 0.203 | 0.232 | 0.290 |
| Mass of (C) Relative to 100 Part by Mass of (A) |  | 182.5 | 192.5 | 195.0 | 202.5 | 207.5 | 212.5 | 222.5 |
| Characteristic Evaluation | Viscosity [Pa · s] | 24 | 18 | 13 | 10 | 8 | 7 | 5 |
|   | Drying Property | ○ | ○ | ○ | ○ | ○ | ○ | ○ |
|   | Film Forming Property | x | ○ | ○ | ○ | ○ | x | x |
|   | Heat Volatilization Residual Balance (%) | 81.0 | 79.5 | 79.0 | 78.0 | 78.0 | 76.5 | 75.0 |
|   | Storage Stability | x | x | ○ | ○ | ○ | ○ | ○ |

The results of Table 2 show that the handling property as a liquid composition also deteriorates because Comparative Example 5 in which (C-1)/(C-2) is less than the lower limit, 0.12, of the range of the present invention is poor in storage stability; moreover Comparative Example 4 with a smaller value thereof is also poor in film forming property, and the value of viscosity increases as that value decreases. On the other hand, Comparative Examples 6 and 7 exceeding the upper limit value, 0.23, of the present invention was confirmed to be poor in film forming property. Therefore, the content ratio of (C) was confirmed to be particularly preferably in the range specified in the present invention. Note that the heat volatilization residual balance (%) when in that range was a value which exceeded 76.5 and was less than 79.

Next, the combination and the content of (C) were fixed to carry out evaluation for the study of a suitable range of the content of (D). In addition to the drying property, film forming property, storage stability, and viscosity described above, the evaluation item was also carried out on the foaming magnification measured under the following conditions. Table 3 also shows the evaluation results.

[Foaming Magnification]

An uncured coating film was formed under the same conditions as in the drying property evaluation, and the film thickness of the coating film at that time was measured with a film thickness meter (Digimatic Micrometer, a product of Mitsutoyo Corporation) (average value of three or more measurement sites). After that, the test piece was allowed to stand for 30 minutes in a thermostatic chamber at 150° C. to promote the expansion of (D) and the curing reaction of (B), and the test piece was taken from the thermostatic chamber, allowed to stand in a room at normal temperature (20° C.) for 30 minutes, and returned to normal temperature (20° C.). The film thickness of the coating film at that time was measured in the same manner as described above, and the foaming magnification (%) was calculated in accordance with the following formula for listing.

foaming magnification (%)=film thickness after heating/film thickness before heating×100

Usually, a foaming magnification suitable for filling adhesion between the members with clearance is desirably 150% or more and more desirably 200% or more, and a particularly preferable foaming magnification in consideration of the mechanical strength and the like of the cured product is in a range of 300 to 700%.

TABLE 3

|   |   | Ingredient | Example 4 | Example 5 | Example 1 | Example 6 | Example 7 | Example 8 | Example 9 |
|---|---|---|---|---|---|---|---|---|---|
| (A) |   | jER 1256B40 | 20 | 20 | 20 | 20 | 20 | 20 | 20 |
| (B) |   | DER 331 | 28 | 28 | 28 | 28 | 28 | 28 | 28 |
|   |   | N-695 | 40 | 40 | 40 | 40 | 40 | 40 | 40 |
|   |   | EXA-830 | 12 | 12 | 12 | 12 | 12 | 12 | 12 |
| (C) | (C-1) | Ethyl Acetate | 6.0 | 6.0 | 6.0 | 6.0 | 6.0 | 6.0 | 6.0 |
|   | (C-2) | Methyl Ethyl Ketone | 34.5 | 34.5 | 34.5 | 34.5 | 34.5 | 34.5 | 34.5 |
| (D) |   | 920 DU 40 | 8.0 | 10.0 | 12.0 | 14.0 | 16.0 | 17.5 | 18.0 |
| (E) |   | DICY7 | 6.8 | 6.8 | 6.8 | 6.8 | 6.8 | 6.8 | 6.8 |
|   |   | 2MAOK-PW | 1.2 | 1.2 | 1.2 | 1.2 | 1.2 | 1.2 | 1.2 |
|   |   | Total | 156.5 | 158.5 | 160.5 | 162.5 | 164.5 | 166.0 | 166.5 |
|   |   | (c-1)/(c-2) | 0.174 | 0.174 | 0.174 | 0.174 | 0.174 | 0.174 | 0.174 |
| Mass of (D) Relative to 100 Parts by Mass of (A) |   |   | 40 | 50 | 60 | 70 | 80 | 88 | 90 |
| Characteristic Evaluation | Viscosity [Pa · s] |   | 7 | 8 | 10 | 11 | 12 | 16 | 19 |
|   | Drying Property |   | ○ | ○ | ○ | ○ | ○ | ○ | ○ |
|   | Film Forming Property |   | ○ | ○ | ○ | ○ | ○ | ○ | ○ |
|   | Storage Stability |   | ○ | ○ | ○ | ○ | ○ | ○ | ○ |
|   | Foaming Magnification |   | 150% | 300% | 400% | 500% | 650% | 700% | 800% |

The results of Examples 1 and 4 to 9 show that the foaming magnification also increases in proportion to the increase in the content of (D) and at the same time that the viscosity also increases, reducing the handling property as a liquid composition.

INDUSTRIAL APPLICABILITY

Since the curable resin composition by the present invention is excellent in drying property and film forming property while being a liquid thermally expandable adhesive having fluidity, highly reliable adhesion is possible, and moreover, storage stability is also excellent. In addition, by forming a coating film from which volatile ingredients have volatilized after coating on the adherends in advance, it is possible to provide an extremely useful adhesive which does not cause problems such as dripping at the time of attachment.

What is claimed is:

1. A curable resin composition comprising:
   (A) a film forming resin,
   (B) an epoxy resin,
   (C) an organic solvent,
   (D) thermally expandable particles, and
   (E) a curing agent ingredient for the (B), wherein
   the (C) is selected from organic solvents having a boiling point of 100° C. or less and being liquid at normal temperature and contains a combination of (C-1) an ester-based solvent and (C-2) one or more solvents selected from ketone-based solvents, ether-based solvents, and glycol-based solvents, and a content ratio between the (C-1) and the (C-2) in a mass ratio is in a range of (C-1)/(C-2)=0.12 to 0.23.

2. The curable resin composition according to claim 1, wherein
   a content of the (C) is 193 to 211 parts by mass relative to 100 parts by mass of the (A).

3. The curable resin composition according to claim 1, wherein
   a content of the (D) is 45 to 88 parts by mass relative to 100 parts by mass of the (A).

4. The curable resin composition according to claim 1, wherein
   the (A) contains a phenoxy resin.

5. The curable resin composition according to claim 1, wherein
   the (E) contains one or more selected from imidazole derivatives and dicyandiamide.

6. The curable resin composition according to claim 1, wherein
   the (A) is a bisphenol A type phenoxy resin.

7. The curable resin composition according to claim 1, wherein
   the (B) is selected from the group consisting of a bisphenol A type epoxy resin, a cresol novolak type epoxy resin, a bisphenol F type epoxy resin, and a mixture thereof.

8. The curable resin composition according to claim 1, wherein
   the ester-based solvent (C-1) has a boiling point in a range of 55 to 85° C., and the solvent (C-2) has a boiling point in a range of 55 to 85° C.

9. The curable resin composition according to claim 1, wherein
   the (D) is a microcapsule-based thermally expandable particle having a gas barrier thermoplastic resin as a shell and enclosing a low boiling point compound in the shell, wherein the low boiling point compound is in the liquid state at normal temperature and has a boiling point of up to approximately 100° C.

10. A cured product formed by curing the curable resin composition according to claim 1.

11. A method of producing a cured product of the curable resin composition according to claim 1, comprising:
    obtaining a cured product of the curable resin composition by heating the curable resin composition to a temperature equal to or higher than an activation temperature of the (E) at which the (E) starts to cure the epoxy resin (B).

12. The method according to claim 11, wherein
    a content of the (C) is 193 to 211 parts by mass relative to 100 parts by mass of the (A).

13. The method according to claim 11, wherein
    a content of the (D) is 45 to 88 parts by mass relative to 100 parts by mass of the (A).

14. The method according to claim 11, wherein
    the (A) contains a phenoxy resin.

15. The method according to claim 11, wherein
    the (E) contains one or more selected from imidazole derivatives and dicyandiamide.

16. The method according to claim 11, wherein
    the (B) is selected from the group consisting of a bisphenol A type epoxy resin, a cresol novolak type epoxy resin, a bisphenol F type epoxy resin, and a mixture thereof.

17. The method according to claim 11, wherein
    the (D) is a microcapsule-based thermally expandable particle having a gas barrier thermoplastic resin as a shell and enclosing a low boiling point compound in the shell, wherein the low boiling point compound is in the liquid state at normal temperature and has a boiling point of up to approximately 100° C.

* * * * *